Sept. 11, 1962 M. K. HAYNES 3,054,093

MAGNETIC CONTROL DEVICE

Filed May 23, 1958

INVENTOR
MUNRO K. HAYNES
BY
William V. Schelberg
AGENT 3,054,093

MAGNETIC CONTROL DEVICE

Munro K. Haynes, Poughkeepsie, N.Y., assignor to International Business Machines Corporation, New York, N.Y., a corporation of New York Filed May 23, 1958, Ser. No. 737,432
8 Claims. (Cl. 340—174)

This invention relates to pulse transfer controlling devices and more particularly to a magnetic coupling device for controlling the direction of pulse transfer in a switching circuit such as a reversible binary magnetic core shift register.

In performing logical operations on binary information in the present-day electronic computing machines, it is often desirable to control the direction of information transfer. For example, this flexible control is of utility when logical operations such as multiplication is to be performed with shift registers. Use of shift registers for logical operation is described in a book published by the D. Van Nostrand Company, Inc., copyright 1955, entitled "Arithmetic Operations in Digital Computers" by R. K. Richards, on pages 144 through 148, which provides a unilateral flow of information. When, however, it is necessary that information be transposed into a preceding stage, means must be provided connecting the register head to tail and a series of read out pulses must be applied, the number of which is dependent upon locating the stage where the information is to be shifted. This type of operation increases machine idling, therefore, decreasing overall operating speeds.

A device, when constructed in accordance with this invention, and connected intermediate an information communicating stage, or the delay or storage stages such as employed in the aforementioned registers, provides means by which information may be delivered to or taken out of a particular circuit. Thus channeling of information in switching circuits and reversibility of information flow in conventional shift registers may be realized. Such a device comprises a first and a second coupling core each having winding means, including an input and an output winding thereon. The input winding on the first core is serially connected with the output winding on the second core, while the output winding on the first core is serially connected with the input winding on the second core. By providing means for selectively biasing each of the cores, the direction of information transfer is selectively controlled. When such a device is connected between signal stages, or a storage means such as utilized in shift registers, the direction of information transfer is controlled by selectively biasing the first or the second core. Further, this type of coupling device is serially connected with the intermediate stages in distinction with parallel connected devices increasing its utility and ease of fabrication.

Accordingly, it is a broad object of this invention to provide a novel magnetic coupling device.

Another object of this invention is to provide a coupling device which is selectively biased to control the direction of information transfer.

Still another object of this invention is to provide a reversible shift register employing a magnetic coupling device in accordance with this invention.

It is a more specific object of this invention to provide a novel reversible shift register employing magnetic cores which does not require the use of an additional unilateral impedance device such as a semiconductor diode or electron tube.

Other objects of this invention will be pointed out in the following description and claims and illustrated in the accompanying drawings, which disclose, by way of example, the principle of the invention and the best mode, which has been contemplated, of applying that principle.

Figures 1, 2, 3:
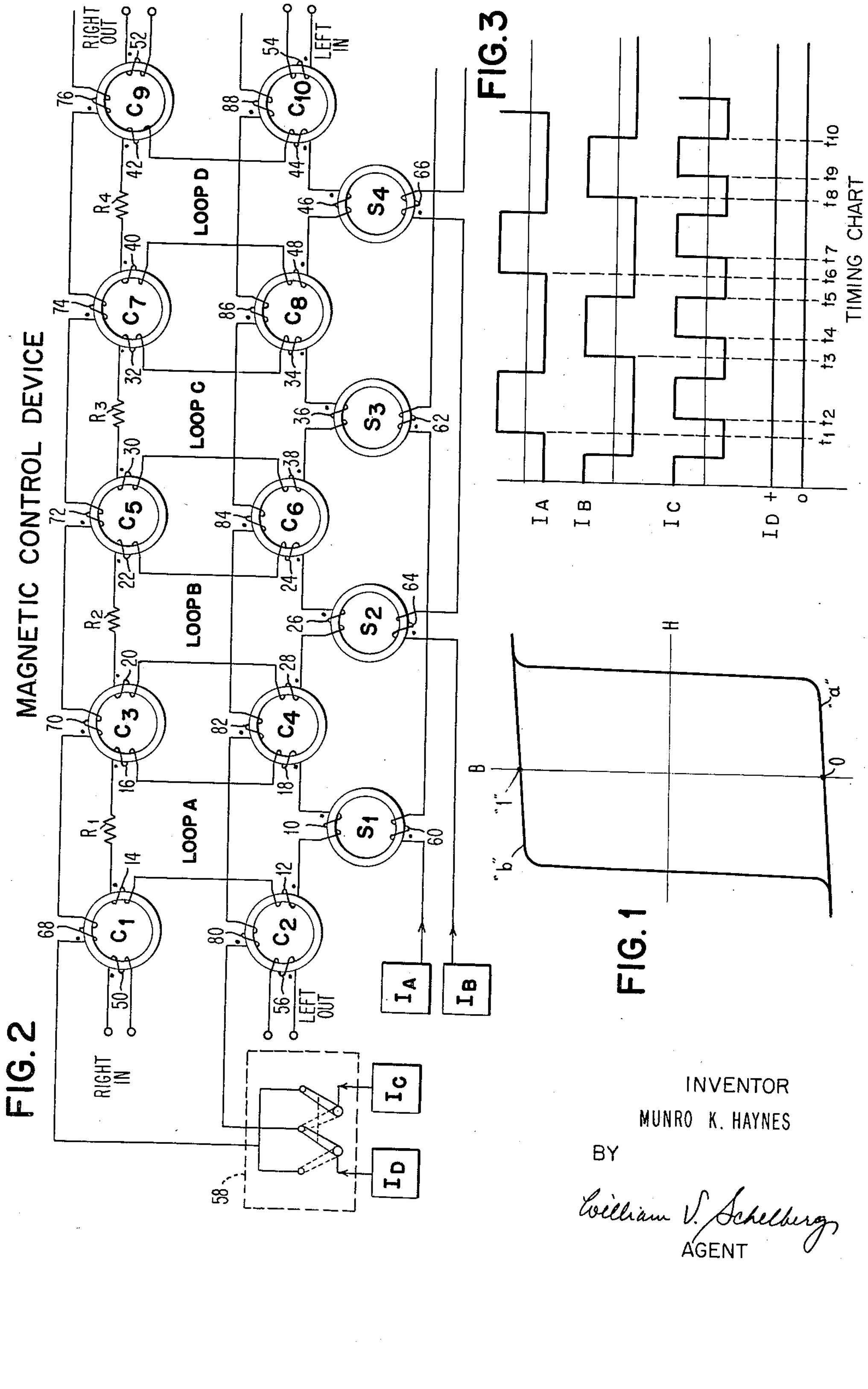
FIGURE 1 is a representation of flux density (B) versus magnetic field (H) obtained by the material of the type employed.
FIGURE 2 is a circuit diagram of a magnetic core reversible shift register illustrating one embodiment of this invention.
FIGURE 3 illustrates the relative timing of current pulses which are required of the operation of the circuit in FIGURE 2.

Referring to FIGURE 1, the hysteresis characteristic for a material of the type employed is shown wherein the opposite remanence states are conventionally utilized for representing binary information conditions and are arbitrarily designated as "0" and "1" while the "knees" of the loop are designated as "*a*," write threshold, and "*b*," read threshold. With a "0" stored, a pulse applied to a winding linking the core in the proper sense, causes the loop to be traversed and the remanence state "1" is attained when the pulse terminates. Such a pulse is hereinafter referred to as a "write" pulse. Similarly, the core is read out or returned to the "0" state in determining what information has been stored by applying a pulse in the reverse sense to the same or another winding. Such a pulse is hereinafter referred to as a "read" pulse. Should a "1" have been stored, a large flux change occurs with the shift from "1" to "0" conditions with a corresponding voltage magnitude developed on the output winding. On the other hand, should a "0" have been stored, little flux change occurs and negligible signal is developed on the signal winding.

A dot is shown adjacent one terminal of each of the windings indicating its winding direction in the FIGURE 2. A write pulse is a positive pulse which is directed into the undotted end of the winding terminal which tends to store a "1," while a read pulse is a positive pulse which is directed into the dotted end of the terminal and tends to apply a negative magnetomotive force, or store a "0."

The arrangement disclosed employs input and output coupling magnetic cores arranged intermediate to so called storage magnetic cores which store certain logical information. These arrangements are adapted to be interconnected with each other and with similar type circuitry through such coupling cores. The coupling cores may be fabricated of ferrite materials like the storage memory cores, however, it is not essential that these cores exhibit the rectangular hysteresis characteristic required of the storage cores as these devices function as variable impedance elements in controlling the transfer of information pulses as will be more evident from the following description. Such interconnecting coupling cores are illustrated in the circuit and are labeled $C_1$, $C_2$, $C_3$, $C_4$, $C_5$, $C_6$, $C_7$, $C_8$, $C_9$, and $C_{10}$ for clarity. Also shown are a number of storage cores S, which are adapted to store information received. Each of the storage cores, S, is adapted to deliver information received to another storage core, via a coupling core, C.

Referring more specifically to the FIGURE 2, the storage core $S_1$, which may be thought of as a communicating stage, is provided with a control winding 10 interconnected with an input winding 12 on the core $C_2$, an output winding 14 on the core $C_1$, and an input winding 16 on the core $C_3$ through a resistor $R_1$ and an output winding 18 on the core $C_4$ which interconnection will hereinafter be referred to as loop A. The core $C_3$ is further provided with an output winding 20 interconnected with an input winding 22 on the core $C_5$ through a resistor $R_2$, an output winding 24 on the core $C_6$, a control winding 26 on the core $S_2$ and an input winding 28 on the core $C_4$ which interconnection will hereinafter be referred to as loop B. The core $C_5$ is also provided with an output winding 30 interconnected with an input winding 32 on the core $C_7$ through a resistor $R_3$, an output winding 34 on the core $C_8$, a control winding 36 on the core $S_3$ and an input winding 38 on the core $C_6$, which interconnection will hereinafter be referred to as loop C. The core $C_7$ is also provided with an output winding 40 interconnected with an input winding 42 on the core $C_9$ through a resistor $R_4$, an output winding 44 on the core $C_{10}$, a control winding 46 on the core $S_4$, and an input winding 48 on the core $C_8$, which interconnection will hereinafter be referred to as loop D. Inputs may be applied to the core $C_1$ by means of an input winding 50, while outputs may be obtained from the register by means of an output means 52 on the core $C_9$, for shift right operation. Inputs may be applied to a winding 54 on the core $C_{10}$ while outputs may be obtained from the register by means of an output winding 56 on the core $C_2$ for shift left operation. All of the even numbered coupling cores may be energized from a clock pulse source $I_C$ or a biasing source $I_D$, and all of the odd numbered coupling cores may similarly be energized from a clock pulse source $I_C$ or the biasing source $I_D$, depending upon the position of a switch 58. The storage cores $S_1$ and $S_3$ are energized from a clock pulse source $I_A$, while similarly the storage cores $S_2$ and $S_4$ are energized from a clock pulse source $I_B$. A winding 60 is provided on the core $S_1$ and a winding 62 on the core $S_3$, which windings are connected with the source $I_A$. Similarly, a winding 64 is provided on the core $S_2$ and a winding 66 is provided on the core $S_4$, which windings are connected with the source $I_B$. A winding 68 is provided on the core $C_1$, a winding 70 on the core $C_3$, a winding 72 on the core $C_5$, a winding 74 on the core $C_7$, and a winding 76 on the core $C_9$, which windings are connected with the switch 58. Similarly, a winding 80 is provided on the core $C_2$, a winding 82 is provided on the core $C_4$, a winding 84 on the core $C_6$, a winding 86 on the core $C_8$, and a winding 88 on the core $C_{10}$, which windings are also connected with the switch 58.

Referring again to the FIGURE 2, assume all cores are in the lower remanence condition or "0" state as shown in the FIGURE 1, except the core $S_1$, which is assumed to be in the "1" state. Information is to be shifted to the right and the switch 58 is positioned as indicated by the dark lines. The sequence of the various shift pulses necessary for the operation of the circuit of FIGURE 2, are illustrated in the FIGURE 3 and certain increments of time, labeled $t_1$ through $t_{10}$ are shown which will be specifically referred to in the detailed description to follow.

At the time $t_1$, the $I_A$ pulse rises and directs a read signal into the windings 60 and 62 on the cores $S_1$ and $S_3$, respectively, which reads out and resets the core $S_1$ from the "1" to the "0" state. The core $S_1$ in resetting induces a voltage in the control winding 10 with its dotted end positive causing a counter-clockwise current in loop A. At the same time, the $I_B$ and the $I_C$ pulses are negative. The $I_B$ pulse energizes the windings 64 and 66 of the cores $S_2$ and $S_4$, respectively, while the $I_C$ pulse energizes the windings 68, 70, 72, 74 and 76 on the cores $C_1$, $C_3$, $C_5$, $C_7$ and $C_9$, respectively, which pulses bias each of the cores linked by the energized windings toward the write threshold, point "*a*" in the FIGURE 1. The current in loop A, due to the resetting of the core $S_1$, tends to read the cores $C_4$ and $C_1$ and to write the cores $C_3$ and $C_2$. Since the direct current source $I_D$ is applied to the windings 80, 82, 84, 86, and 88 on the core $C_2$, $C_4$, $C_6$, $C_8$, and $C_{10}$, respectively, which holds each of these cores in the "0" state at all times, and the core $C_1$ is already in the "0" state, the core $C_3$ is switched from the "0" to the "1" state. The core $C_3$ in switching induces a voltage in the output winding 20 with the undotted end positive to cause a counter-clockwise current in loop B. This current in loop B tends to write the cores $C_4$, $S_2$, and $C_5$, and to read the core $C_6$. This current has no effect on the cores $C_4$ or $C_6$ due to the bias applied by the constant $I_D$ source as described above, and due to the greater number of turns in the winding 26 on the core $S_2$ as compared to the number of turns in the winding 22 on the core $C_5$, the core $S_2$ is preferentially switched from the "0" to the "1" state.

While the $I_A$ pulse is positive at the time $t_2$, the $I_C$ pulse turns positive to direct a read signal into the windings 68, 70, 72, 74 and 76 on the cores $C_1$, $C_3$, $C_5$, $C_7$, and $C_9$, respectively, which resets the core $C_3$ from the "1" to the "0" state. While resetting of the core $C_3$ takes place, a voltage is induced in the windings 16 and 20 with their dotted ends positive, causing a counter-clockwise current in loop A and a clockwise current in loop B. The current in loop A tends to write the cores $C_2$ and $S_1$ while tending to read the cores $C_1$ and $C_4$, and the current in loop B tends to read the cores $C_5$, $S_2$, and $C_4$, while tending to write the core $C_6$. Each of the cores $C_2$, $C_4$, and $C_6$ are held in the "0" state by the constant $I_D$ drive to their windings 80, 82, and 84, respectively, while all the cores $C_1$ and $C_5$ are already in the "0" state, so that these cores are unaffected. Since the $I_A$ pulse is still positive, the core $S_1$ is held in the "0" state due to the drive in its winding 60, while the core $S_2$ is held in the "1" state due to the $I_B$ drive, which is still negative, to the winding 64 on the core $S_2$. All cores are now in the "0" state except the core $S_2$, which has received the information previously stored in the core $S_1$, and is in the "1" state. Subsequently, at the time $t_3$, after the $I_A$ and $I_C$ pulses have swung negative, the $I_B$ pulse turns positive to direct a read signal into the windings 64 and 66 on the core $S_2$ and $S_4$, respectively. The core $S_2$ is then reset from the "1" to the "0" state and in so doing induces a voltage in its control winding 26 with the dotted end positive, causing a counter-clockwise current in loop B. This current in loop B tends to read the cores $C_6$ and $C_3$, while tending to write the cores $C_5$ and $C_4$. Since the core $C_3$ is already in the "0" state, and the cores $C_4$ and $C_6$ are held in the "0" state, by the $I_D$ drive through their windings 82 and 84, respectively, the core $C_5$ is switched from the "0" to the "1" state. Switching of the core $C_5$ to the "1" state induces a voltage in the output winding 30 with its undotted end positive, causing a counter-clockwise current in loop C which tends to write the cores $C_6$, $S_3$ and $C_7$, while tending to read the core $C_8$. Since the cores $C_6$ and $C_8$ are held in the "0" state by the constant $I_D$ drive in their windings 84 and 86, respectively, and the number of turns in the winding 36 on the core $S_3$ is greater than the number of turns in the winding 32, on the core $C_7$, the core $S_3$ is preferentially switched from the "0" to the "1" state. The $I_C$ pulse then turns positive at $t_4$ time to direct a read signal into the windings 68, 70, 72, 74 and 76 on the cores $C_1$, $C_3$, $C_5$, $C_7$ and $C_9$, respectively, which resets the core $C_5$ from the "1" to the "0" state. The core $C_5$ in being reset induces a voltage in the windings 22 and 30 with their dotted ends positive causing a counter-clockwise current in loop B and a clockwise current in loop C, respectively. The current in loop B tends to read the cores $C_3$ and $C_6$ while tending to write the cores $C_4$ and $S_2$, and the current in loop C tends to read the cores $C_7$, $S_3$ and $C_6$ while tending to write the core $C_8$. The constant $I_D$ bias as applied to the windings 82, 84 and 86 on the cores $C_4$, $C_6$ and $C_8$, respectively, holds the cores in the "0" state, so that they are unaffected. The cores $C_3$ and $C_7$ are already in the "0" state, while the $I_B$ pulse is still positive energizing the winding 62 on the core $S_2$ to bias the core $S_2$ in the "0" state and the $I_A$ pulse is negative energizing the winding 60 on the core $S_3$ to bias the core $S_3$ in the write "1" direction, avoiding any retrograde switching by these loop currents. At the time $t_5$, all cores are left in the "0" state, except the core $S_3$ which is left in the "1" state, thus information has been successfully transferred to the right from the storage core $S_1$ to the core $S_2$ and thence to the core $S_3$. Further application of the pulses would provide transfer of the "1" stored in the core $S_3$, into the core $S_4$ and thence to further logical circuitry connected with the output winding 52 on the core $C_9$.

Assume that it is now desired to shift the information stored in the core $S_3$ to the left. The switch 58 is operated to assume the position indicated by the dotted lines. The change in the position of the switch may take place in the interval between $t_5$ and $t_6$. As an initial condition, all cores are in the "0" state except the core $S_3$ which is in the "1" state. When the $I_A$ pulse turns positive, at $t_6$, a read signal is directed into the windings 60 and 62 on the cores $S_1$ and $S_3$, respectively, which resets the core $S_3$ from the "1" to the "0" state and in so doing induces a voltage in the control winding 36, with the dotted end positive, causing a counter-clockwise current in loop C. This current in loop C tends to write the cores $C_7$ and $C_6$ while tending to read the cores $C_8$ and $C_5$. Upon operation of the switch 58 as described above, the constant $I_D$ bias is now applied to the windings 68, 70, 72, 76, and 78 on the cores $C_1$, $C_3$, $C_5$, $C_7$, and $C_9$, respectively, which holds the cores in the "0" state at all times. Further, since the core $C_8$ is already in the "0" state, the core $C_6$ switches from the "0" to the "1" state and in so doing induces a voltage in the output winding 24 with the undotted end positive, causing a counter-clockwise current in loop B. This current in loop B tends to write the cores $C_5$, $C_4$ and $S_2$ while tending to read the core $C_3$. Since the cores $C_3$ and $C_5$ are biased to the "0" state, as described above, they are unaffected and provision for a greater number of turns in the control winding 26 on the core $S_2$ than the number of turns in the input winding 28 on the core $C_4$, permits preferential switching of the core $S_2$ from the "0" to the "1" state to take place. The cores $C_6$ and $S_2$ are then left in the "1" state while the remaining cores are left in the "0" state. When the $I_C$ pulse turns positive, at $t_7$ time, a read signal is directed into the windings 80, 82, 84, 86 and 88 on the cores $C_2$, $C_4$, $C_6$, $C_8$ and $C_{10}$, respectively, which resets the core $C_6$ from the "1" to the "0" state. The core $C_6$ in being reset from the "1" to the "0" state induces a voltage in the windings 24 and 38 with their dotted ends positive, to cause a counter-clockwise current in loop C and a clockwise current in loop B. The current in loop C tends to write the cores $S_3$ and $C_7$, while tending to read the cores $C_8$ and $C_5$ while the current in loop B tends to read the cores $S_2$, $C_4$, and $C_5$, and to write the core $C_3$. Since the cores $C_3$, $C_5$ and $C_7$ are biased by a constant $I_D$ current, as described above, they are unaffected, while similarly the cores $C_8$ and $C_4$ are unaffected, since they are already in the "0" state. The current in loop B is then tending to switch the core $S_2$ from the "1" to the "0" state, but is inhibited from doing so since the $I_B$ pulse is negative at this time to energize the winding 64 on the core $S_2$ biasing the core $S_2$ toward the "1" state. Similarly, since the $I_A$ pulse is still positive, the winding 62 on the core $S_3$ is energized biasing the core $S_3$ toward the "0" state, inhibiting any effect by the current in loop C. The core $C_6$ is thus reset and the core $S_2$ is left in the "1" state.

When the $I_B$ pulse turns positive, at $t_8$, a read signal is directed into the windings 64 and 66 on the cores $S_2$ and $S_4$, respectively, which resets the core $S_2$ from the "1" to the "0" state. The core $S_2$, in being reset, induces a voltage in the control winding 26 with the dotted end positive, causing a counter-clockwise current in loop B which tends to read the cores $C_6$ and $C_3$ while tending to write the cores $C_5$ and $C_4$. Since the core $C_6$ is already in the "0" state, while the cores $C_3$ and $C_5$ are biased to the "0" state by the constant $I_D$ current applied to the windings 70 and 72, respectively, the core $C_4$ is switched from the "0" to the "1" state. The core $C_4$ in switching induces a voltage in the output winding 18 with the undotted end positive, causing a counter-clockwise current in loop A which tends to write the cores $C_3$, $C_2$ and $S_1$, and to read the core $C_1$. The cores $C_1$ and $C_3$ are held in the "0" state due to the $I_D$ drive in their windings 68 and 70, respectively, allowing preferential switching of the core $S_1$ to the "1" state, since the number of turns in the control winding 10 on the core $S_1$ is greater than the number of turns in the winding 12 on the core $C_2$. When the $I_C$ pulse turns positive, at $t_9$, a read signal is directed to the windings 80, 82, 84, 86, and 88 on the cores $C_2$, $C_4$, $C_6$, $C_8$, and $C_{10}$, respectively, which resets the core $C_4$ from the "1" to the "0" state inducing a voltage in the windings 18 and 28 with their dotted ends positive, causing a clockwise current in loop A and a counter-clockwise current in loop B. The current in loop A tends to read the cores $S_1$, $C_2$ and $C_3$ while tending to write the core $C_1$, and the current in loop B tends to read the cores $C_6$ and $C_3$, while tending to write the cores $S_2$ and $C_5$. Since the cores $C_1$, $C_3$ and $C_5$ are held in the "0" state due to the constant $I_D$ drive in the windings 68, 70 and 72, respectively, and the cores $C_2$ and $C_6$ are already in the "0" state, these cores are unaffected. The $I_A$ clock pulse, at this time, is negative and energizes the winding 60 on the core $S_1$ biasing the core toward the "1" state, overcoming the applied loop current in the winding 10 on the core $S_1$. Similarly, the current in loop B which energizes the winding 26 on the core $S_2$ is overcome, since the $I_B$ pulse is still positive which energizes the winding 64 on the core $S_2$ biasing the core toward the "0" state. Further application of the various pulses provides transfer of the "1" via the coupling core $C_2$ to engender an output in the winding 56 which may be utilized by further logical circuitry. It should be understood, that the shift register described above is only by way of illustration of how this novel coupling device may be utilized. Thus, the storage core, as described above, is considered a signal stage wherein storage is attained, and in this particular embodiment may be referred to as a storage stage. When a plurality of such coupling means are connected in series with a particular signal stage, channeling of information may be realized into one or more circuits such as, for example, if we consider, in the device described above, when, instead of a single coupling device associated with each storage stage, two such devices are serially connected and associated with each storage stage. Upon transfer of information out of the storage stage, depending upon the biasing applied, information may be transferred into a plurality of circuits. Thus, while there has been shown and described the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims:

What is claimed is:

1. In a binary switching system, the combination comprising a first and a second signal storage stage, a magnetic coupling means arranged intermediate and serially coupling said first and second stages, said coupling means including a first and a second magnetic coupling core, winding means including an input and an output winding on each of said cores and means series connecting the input winding on said first core with the output winding on said second core and the output winding on said first core with the input winding on said second core, means for selectively reading out said stages for transfer of information, and means connected with said winding means for biasing said cores to selectively control the direction of information transfer.

2. The combination as set forth in claim 1 wherein each of said magnetic coupling cores is capable of attaining bistable states of flux remanence.

3. In an information handling magnetic core reversible shift register, a plurality of signal stages wherein each stage includes a storage magnetic core; control winding means on each said storage core; a first and a second coupling magnetic core associated with each said storage core; input and output winding means on each of said coupling cores; circuit means connecting the output winding means of the first coupling core and the input winding means on the second coupling core associated with each storage core with the control winding means on the associated storage core and the output winding means on the second coupling core and the input winding means on the first coupling core associated with the succeeding storage core of said register; means for establishing a datum residual state in said cores for transferring information; and means for biasing said first and second coupling cores for selectively controlling the direction of information transfer.

4. A device as set forth in claim 3 wherein said circuit means is a series circuit including a resistor only.

5. A device as set forth in claim 4 wherein said means for establishing a datum residual state in said cores includes a shift winding means on each of said storage cores alternate one of which are serially connected with a first and a second clock pulse source respectively.

6. A device as set forth in claim 5 wherein said biasing means comprises shift winding means on each of said first and said second coupling cores, a direct current source, and switching means for selectively applying said direct current source to the shift winding means on said first and second coupling core.

7. A device as set forth in claim 6 wherein said means for establishing a datum residual state in said cores includes a third clock pulse source connected with said switching means adapted to be selectively connected with the shift winding means on the said first and second coupling cores.

8. A device as set forth in claim 7 including means for energizing said shift winding means including said first, second, and third clock pulse sources wherein said first, third and second sources are actuated in sequence.

References Cited in the file of this patent

UNITED STATES PATENTS

| | | |
|---|---|---|
| 2,654,080 | Browne | Sept. 29, 1953 |
| 2,781,503 | Saunders | Feb. 12, 1957 |
| 2,805,409 | Mader | Sept. 3, 1957 |
| 2,886,799 | Crooks | May 12, 1959 |
| 2,911,621 | Crooks | Nov. 3, 1959 |
| 2,953,774 | Slutz | Sept. 20, 1960 |